United States Patent Office 2,698,725
Patented Jan. 4, 1955

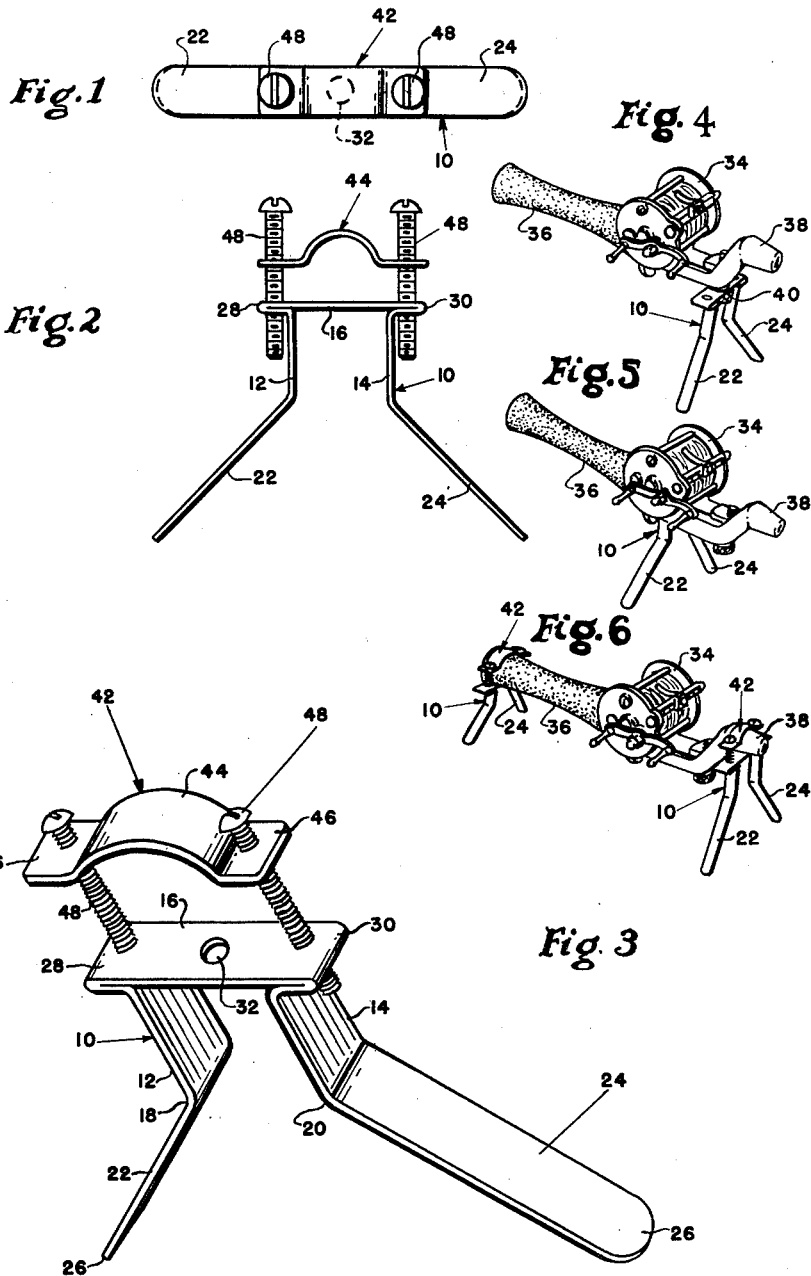

2,698,725

FISHING POLE SUPPORT

Worthington B. Triplett, York, Pa.

Application May 9, 1952, Serial No. 286,972

2 Claims. (Cl. 248—38)

This invention relates to a fishing pole support and more particularly to a support of the type which may readily be detachably secured to any one of a number of standard commercial fishing poles to support the same at a desired angle while resting upon a supporting surface. When fishing, it frequently occurs that a fisherman desires to rest the pole while waiting for fish to bite and various kinds of supports have been previously devised for supporting a fishing pole under these conditions. Many of such supports are relatively complex and not only is the cost quite high but the use of such support frequently encumbers the ready use of a fishing pole when it is desired to manipulate the same as when a bite is obtained.

It is an object of the present invention to provide a simple, inexpensive, durable and relatively lightweight clamp which may be attached to any desired portion of a fishing pole, particularly in the handle area thereof, said support being operable to hold the fishing pole at a desired angle and also prevent the same from rolling sidewise, the support nevertheless being of such nature that it does not encumber the use of the pole when a bite occurs and the handle of the fishing pole may instantly be grasped from a rest position by a fisherman to manipulate the pole and secure a fish on the hook without having to detach the pole from the support in any way.

It is another object of the invention to provide a fishing pole support which may be inexpensively and quickly fabricated from easily obtainable strip metal, the support being quickly attachable to a fishing pole and of such light weight that no encumbrance is added to manipulation of the pole when desired.

It is still another object of the invention to provide pole clamping means on a fishing pole support which will permit attaching the support on a wide variety of fishing poles.

Details of the foregoing objects and of the invention as well as other objects thereof are set forth in the specification and illustrated in the accompanying drawing comprising a part thereof.

In the drawing:

Fig. 1 is a top plan view of a fishing pole support embodying the principles of the present invention.

Fig. 2 is a side elevation of the support shown in Fig. 1.

Fig. 3 is an enlarged perspective view of the fishing pole support shown in Figs. 1 and 2.

Figs. 4, 5 and 6 respectively are illustrations of a support made in accordance with the present invention and applied in various ways to conventional fishing poles, the fishing poles illustrated in said figures showing the handle and reel portions only.

Referring to the drawing and particularly Figs. 1 through 3, the fishing pole support embodying the present invention comprises a supporting member 10 which is preferably formed from strip metal such as strip steel, brass or other suitable metal. The supporting member is bent from a strip of said metal of suitable length into a substantially U-shaped configuration, the legs 12 and 14 being substantially parallel adjacent the bight portion 16 of the U-shaped member and, intermediately of the ends thereof, the legs are bent at 18 and 20 so that the outer end portions 22 and 24 of the legs diverge outwardly from each other, the angle between said outer portions of the legs being substantially 90° as can be readily seen from Fig. 2. It wil be understood that this angle can be varied within practical limits. The tips 26 of the outer portions of the legs are also preferably rounded as clearly shown in Fig. 3.

The supporting member also includes ears 28 and 30 which extend outwardly in opposite directions from the bight portion 16, said ears comprising compressed, flat, return bends of the strip of material from which the supporting member is formed. In the preferred embodiment of the invention, the bight portion 16 is substantially flat, and the ears 28 and 30, which comprise extensions of said bight portion, are substantially in the same plane with each other. It will be understood of course that, if desired, the bight portion 16 may be curved intermediately of its ends so as better to provide a seat to receive a portion of a fishing pole or a fishing pole handle. Further, the bight portion 16 is also provided centrally thereof with an aperture 32 for purposes of receiving a clamping screw such as one which may be used to secure the reel 34 to the handle 36 of a fishing pole 38 as shown especially in Fig. 5. In Fig. 4, a clamping thumb bolt 40 is shown securing the supporting member 10 to another portion of the handle of the fishing pole 38.

While the supporting member 10 may be secured to a fishing pole as described above relative to Figs. 4 and 5, the present invention also comprises a clamping member 42 which is preferably formed from material similar to that from which supporting member 10 is formed, the clamping member 42 being substantially as long as the bight portion 16 including the ears 28 and 30. Clamping member 42 is formed intermediately of its ends with a curved portion or clamping seat 44 and the ends 46 thereof are disposed in the same plane in the preferred embodiment of the invention. The outer ends of the clamping member 42 are apertured to receive clamping bolts 48; the ears 28 and 30 being similarly apertured. Preferably, the apertures in the ears 28 and 30 are threaded whereas the apertures in the outer ends of the clamping member 42 freely pass the bolts. The return bend nature of the ears 28 and 30 affords substantial thickness for threading and the resilience of the material even affords somewhat of a locking action. Thus, upon rotating the bolts 48, the clamping member 42 will be drawn into clamping relationship relative to the bight portion 16 of the supporting member 10. The parallelism of the portions 12 and 14 of the legs of the supporting member 10 provides space on the outside of the legs to accommodate the bolts when the clamping member 44 is in clamped position. As illustrated in Fig. 6, either part of the handle 36 or part of the fishing pole 38 may readily be clamped between the supporting member 10 and the clamping member 42. If desired several of the supports comprising said supporting member and clamping member may be used on a single fishing pole as shown in Fig. 6.

In view of the simplicity of the support comprising the present invention, it may be semi-permanently but detachably secured to a fishing pole in any of the manners illustrated in Figs. 4 through 6 or in any other suitable manner permitted by the construction of the support. When one or even several supports are attached to a fishing pole, no encumbrance occurs when it is desired to manually grasp the pole from a rest or supported position as when it is desired to secure a fish to a hook. The weight of the supports is negligible, whereby the weight and balance of a pole is not appreciably affected.

The support embodying the invention may readily be made from strip brass metal for example and, if desired, the same may be plated with suitable tarnish resisting material such as chromium, cadmium or nickel, whereby the support will be rust proof. The gage or thickness of the metal from which the members of the support are formed may also be sufficiently thin that the supporting member and clamping member are somewhat resilient so as to render the attachment of the support to a fishing pole more effective.

From the foregoing, it will be seen that the present invention comprises an inexpensive, lightweight support which may quickly be attached to a fishing pole by the use of no tools other than a screw driver or possibly a coin for manipulating the clamping screws 48. The lightweight nature of the support does not affect the balance of the pole or appreciably increase the weight thereof and no encumbrance or inconvenience is experienced by a fisherman manipulating the pole with one or more of the supports attached thereto. The support may be attached especially to the handle portion of a fishing pole in a number of locations so that a desired angle of the pole may be obtained while resting on a supporting surface and the support prevents the pole from rolling or tilting.

While the invention has been shown and illustrated in its preferred embodiment, and has included certain details, it should be understood that the invention is not to be limited to the precise details herein illustrated and described since the same may be carried out in other ways falling within the scope of the invention as claimed.

I claim:

1. A support for a fishing pole comprising in combination, a supporting member bent from a strip of relatively thin metal to form a substantially U-shaped member the legs of which adjacent the bight portion are approximately parallel and said legs being bent intermediately of the ends thereof to diverge outwardly from each other and comprise ends engageable with a supporting surface, ears extending outwardly in opposite directions from the bight portion of the supporting member and comprising compressed flat return bends of the strip of metal to provide appreciable thickness for said ears, said ears having threaded apertures therein, a strip-like clamping member having ends substantially in the same plane and said ends being provided with apertures spaced similarly to those in the ears of said clamping member, and screws extending through the apertures in said members and operable to clamp a fishing pole between said clamping member and the outer surface of said bight portion of said clamping member.

2. A support for a fishing pole comprising in combination, a supporting member bent from a strip of relatively thin metal to form a substantially U-shaped member the legs of which adjacent the bight portion are approximately parallel and said legs being bent intermediately of the ends thereof to diverge outwardly from each other and comprise ends engageable with a supporting surface, said ends being rounded, ears extending outwardly in opposite directions from the bight portion of the supporting member and comprising compressed flat return bends of the strip of metal to provide appreciable thickness for said ears, said ears having threaded apertures therein, a strip-like clamping member curved intermediately of its ends to provide a clamping seat and the ends thereof being substantially in the same plane, said ends being provided with apertures spaced apart similarly to the spacing of the apertures in the ears of said clamping member, and screws extending through the apertures in said members and operable to clamp a fishing pole between said clamping member and the outer surface of said bight portion of said clamping member.

References Cited in the file of this patent

UNITED STATES PATENTS

| 1,643,689 | Woodin | Sept. 27, 1927 |
| 2,544,773 | Barham | Mar. 13, 1951 |
| 2,575,254 | Blaugrund | Nov. 13, 1951 |

FOREIGN PATENTS

| 13,318 | Great Britain | June 17, 1896 |